No. 634,204.  
P. DIEHL.  
LUBRICATING CRANKS.  
(Application filed June 3, 1899.)  
Patented Oct. 3, 1899.

(No Model.)

Witnesses:  
C. W. Benjamin  
Arthur W. Calvert

Inventor:  
Philip Diehl  
by Henry Calver, atty.

UNITED STATES PATENT OFFICE.

PHILIP DIEHL, OF ELIZABETH, NEW JERSEY, ASSIGNOR TO THE SINGER MANUFACTURING COMPANY, OF NEW JERSEY.

LUBRICATING CRANKS.

SPECIFICATION forming part of Letters Patent No. 634,204, dated October 3, 1899.

Application filed June 3, 1899. Serial No. 719,181. (No model.)

*To all whom it may concern:*

Be it known that I, PHILIP DIEHL, a citizen of the United States, residing at Elizabeth, in the county of Union and State of New Jersey, have invented certain new and useful Improvements in Means for Lubricating Cranks, of which the following is a specification, reference being had therein to the accompanying drawings.

This invention has for its object to provide means whereby the oil which is applied to a rapidly-rotating crank to lubricate the bearing or joint between such crank and the eye of the pitman which it operates will be retained in the bearing or joint by centrifugal action and will also be caused to circulate in such bearing or joint by such action instead of being expelled or thrown off, as heretofore, leaving the bearing or joint dry. Much difficulty has been encountered in the operation of high-speed sewing-machines running at from eighteen hundred to two thousand five hundred or more stitches per minute (representing from eighteen hundred to two thousand five hundred or more rotations of the driving-shaft per minute) by the heating of the crank of the driving-shaft at its joint with the pitman connecting said shaft with the shuttle-shaft below, this difficulty arising from the fact that the lubricating-oil was quickly thrown off or expelled from the joint by centrifugal action, leaving the joint dry. I have remedied this difficulty by making the pitman strap or eye wider than that part of the crank against which it bears and providing the said pitman strap or eye at the sides of the bearing portion of the crank with oil grooves or pockets, forming receptacles into which the oil which would otherwise be thrown off by centrifugal action is forced by such action into these receptacles as the crank revolves, these oil grooves or pockets having imperforate outer walls and being preferably connected across the crank-bearing by transverse oil grooves or ducts, so that the oil can freely circulate in the joint or bearing, as will be hereinafter more fully explained.

Figure 2:
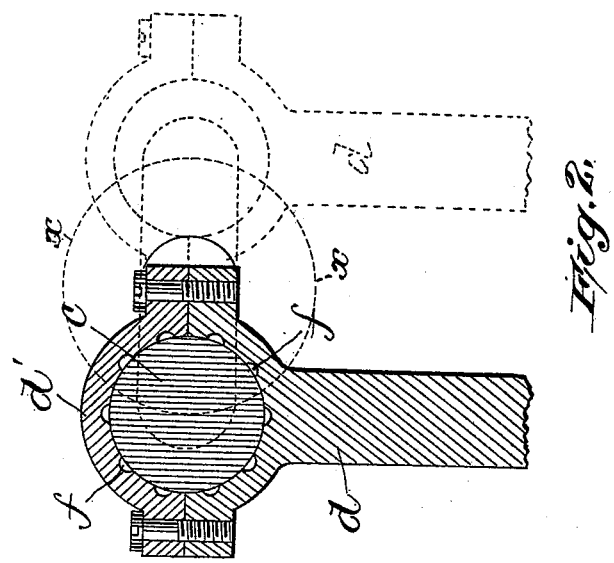
Figure 3:
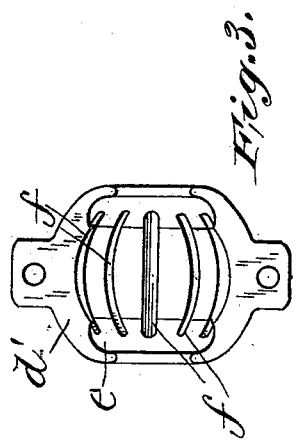
Figure 1:
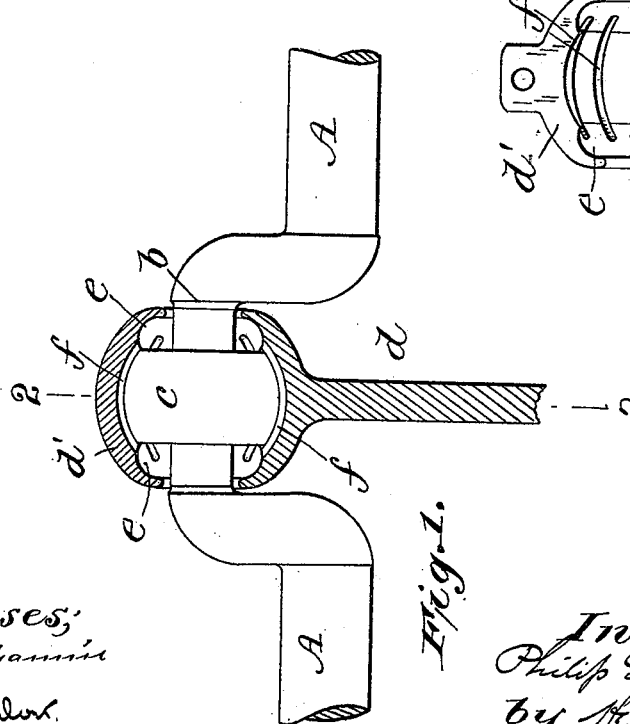

In the accompanying drawings, Figure 1 is a sectional elevation illustrative of my invention, and Fig. 2 is a transverse section of the same on line 2 2, Fig. 1. Fig. 3 is a detail inside view of the pitman-cap.

A denotes a portion of a rotary shaft provided with a crank $b$, having a convex or ball-like bearing portion $c$, encircled by the strap or eye of a pitman $d$. The bearing or acting portion $c$ of the crank instead of being made as a complete or nearly complete ball, as heretofore, is narrowed or cut away at its sides, and the eye of the pitman instead of being narrower than the ball or bearing portion of the crank, as is usual, is made wider, and at the sides of the ball or bearing portion of the crank grooves or oil-pockets $e$ are formed in the interior of the eye of the pitman. These grooves $e$ have imperforate outer walls and are preferably annular, so as to be continuous around the inside of the eye of the pitman, and said annular grooves are preferably connected with each other across the bearing portions of the pitman eye or strap, and consequently across the bearing portion of the crank, by transverse grooves $f$, formed in the interior of said eye or strap and opening at their ends into the annular grooves or oil-pockets $e$.

From the foregoing it will be understood that any oil which is applied to the crank to lubricate the same will when the said crank is in rotation be forced outward by centrifugal action into the annular grooves or oil-pockets $e$ in the eye of the pitman, and this same centrifugal force will have a tendency to cause the oil to seek to reach the higher or outer portions of the ball-and-socket bearing of the crank and strap, this tendency of the oil to enter and remain in the bearing being assisted by the transverse grooves $f$. Owing to the fact that the bearing portion $c$ of the crank not only turns or rotates on its own axis, but also revolves in an orbit around the axis of the shaft A, the oil in the oil grooves or pockets $e$ $f$ will be kept in constant movement or circulation when the crank is in operation, being forced against or away from the surface of the bearing portion $c$ of the crank according to whether such surface may be at any time on the outer or inner side of the orbit (denoted by the dotted circle $x$ in Fig. 2) described by the axis of the bearing portion of the crank. This action will be understood from Fig. 2, from which it will be seen that in the positions of the parts in full lines the tendency of the oil will be to move to the left, so that the oil in the grooves $f$ on right or inside part of the bearing or joint will be forced against the ball or bearing portion $c$ of the crank to keep the same lubricated, while when the crank has traveled around to the position denoted by dotted lines in Fig. 2 the oil in the grooves $f$ at the left of the bearing will be forced against the ball or bearing portion of the crank; also, this same action is constantly going on with reference to other positions of the revolving crank. Thus the oil in the grooves $f$ in the top of the pitman-cap $d'$, and which when the crank is at the top of the dotted circle $x$ is forced away from the ball or bearing portion $c$ of the crank, is thrown against said ball or bearing portion $c$ when the crank is at the bottom of its orbit of rotation and the oil in the bottom portion of the pitman strap or eye and which is forced upward against the bearing portion $c$ when the crank is at the top of its orbit will be thrown downward when the crank reaches the bottom of its orbit.

From the foregoing it will be understood that my invention provides means whereby centrifugal force which has heretofore served to expel the lubricating-oil from the crank-bearing is utilized to retain the oil in the bearing or joint and cause it to circulate therein, so that when oil has once been applied to the crank it will stay there indefinitely and the difficulty arising from want of lubrication of rapidly-rotating cranks is wholly avoided, as has been demonstrated by practice.

I do not wish to be understood as limiting my invention to the details herein shown and described, as the invention is capable of use in connection with other forms of cranks or rotating devices for operating pitmen than that herein illustrated; also, the proportional sizes of the oil pockets or grooves may be varied as may be required or the said grooves may be of different forms or the transverse grooves $f$ might run diagonally or across each other, all without departing from the essence of the invention.

Having thus described my invention, I claim and desire to secure by Letters Patent—

1. The combination with a rotating crank, of a pitman having an eye or strap which is wider than the bearing portion of said crank, and the interior of which eye or strap is provided with oil grooves or pockets at the sides of the said bearing portion of said crank and which oil grooves or pockets have imperforate outer walls, so that the oil will be retained therein by centrifugal force.

2. The combination with a rotating crank, of a pitman having an eye or strap which is wider than the bearing portion of said crank, and the interior of which eye or strap is provided with oil grooves or pockets at the sides of the said bearing portion of said crank, said eye or strap being also provided with interior transverse oil grooves or pockets connecting said first-named grooves or pockets.

3. The combination with a rotating crank having a convex or ball-like bearing portion, of a pitman having an eye or strap which is wider than the said bearing portion of said crank and the interior of which eye or strap is provided with annular oil grooves or pockets at the sides of said bearing portion, and which oil grooves or pockets have imperforate outer walls so that the oil will be retained therein by centrifugal force.

4. The combination with a rotating crank having a convex or ball-like bearing portion, of a pitman having an eye or strap which is wider than the said bearing portion of said crank and the interior of which eye or strap is provided with annular oil grooves or pockets at the sides of said bearing portion, said eye or strap being also provided interiorly with transverse oil grooves or pockets connecting said annular grooves.

In testimony whereof I affix my signature in the presence of two witnesses.

PHILIP DIEHL.

Witnesses:
HENRY J. MILLER,
HAROLD W. BROWN.